250# United States Patent Office 2,740,708
Patented Apr. 3, 1956

2,740,708
METHOD OF PRODUCING METAL POWDER FROM SOLUTIONS

Henry Michael Papée, Ottawa, Ontario, Canada, assignor to Sherritt Gordon Mines Limited, Toronto, Ontario, Canada, a company of Ontario No Drawing. Application March 14, 1955, Serial No. 494,289

6 Claims. (Cl. 75—108)

This invention relates to the precipitation of metal as metal powder from solutions in which values of such metal are present as dissolved salts by treatment of the solution with a reducing gas at elevated temperature and pressure.

Hydrometallurgical methods for the extraction of metal values from metal bearing material and their dissolution as soluble salts in leach solutions or lixiviants are being closely studied and investigated for the purpose of replacing with chemical methods, where possible, conventional pyrometallurgical methods for the extraction of metal values from ores, concentrates, matte, speiss, metallurgical residues and secondary metals.

Hydrometallurgical methods suitable for the extraction of metal values from metal bearing material and for the recovery of such metal values substantially free from impurities and in a form suitable for use in commerce and industry possess many advantages over conventional pyrometallurgical processes. It has been found that many metal bearing materials heretofore treated by conventional pyrometallurgical methods are readily amenable to treatment for the recovery of desired metal products and valuable by-products by hydrometallurgical methods with attendant substantial savings in capital and operating costs, greatly improved metal recovery, and accompanied by the recovery of valuable by-products.

Hydrometallurgical methods for the extraction and subsequent recovery of metal values contained in metal bearing material usually involve leaching the material with a leach solution or lixiviant under conditions under which metal values are extracted rapidly from the metal bearing material with a high degree of extraction efficiency and dissolved in the leach solution. The leach solution containing dissolved metal values is then treated for the precipitation and recovery of desired metal values.

There have been discovered and developed recently a number of hydrometallurgical processes for the extraction of desired metal values from metal bearing material and their dissolution, as soluble salts, in various types of leach solutions under conditions which solubilize the desired metal values and dissolve them in the leach solution from which they are recovered, preferably as product metals.

There have also been discovered and developed recently several methods of converting metal values dissolved in a leach solution or lixiviant to and precipitating them from the solution as metal powders substantially free from impurities by treatment of the solution at elevated temperature and pressure with a reducing gas such as methane, carbon monoxide or hydrogen or mixtures of such gases.

It is found, also, in the reduction and precipitation of nickel and cobalt as metal powders from solutions in which they are present as dissolved salts by treatment of the solution with a reducing gas, that they tend to deposit or plate on the interior walls of the reaction vessel and on the blades and shaft of the agitator or agitators by means of which the contents of the reaction vessel are maintained in suspension during the reducing reaction. Such plating or deposition interferes seriously with the rate, efficiency and the continuity of the reducing reaction and is very difficult to remove from the reaction vessel. This problem is particularly acute when the interior surface of the reaction vessel is formed of metal, such as stainless steel or other corrosion resistant metal or alloy. It is less acute when the interior surface of the reaction vessel is formed of glass.

It has now been found that the difficulty arising from the plating or deposition of metal on the walls and on ancillary parts of the interior of the reaction vessel can be overcome by providing in the solution to be treated by gas reduction, preferably prior to the initiation of reduction, a finite amount of an addition agent which forms a soapy or soap-like film on the interior surfaces of the reaction vessel and ancillary parts exposed to the solution undergoing treatment. Higher fatty acids, salts of higher fatty acids and compounds which contain higher fatty acids or salts of higher fatty acids are illustrative of the addition agents which can be employed with advantage in the operation of the method of the present invention. It is found that these addition agents form a soapy or soap-like film on the interior of the reaction vessel to which the metal does not adhere as it is precipitated from the solution. Examples of higher fatty acids suitable for the purpose of this invention are palmitic acid, stearic acid and oleic acid. The acid can be added as such to the solution to be treated or undergoing treatment by gas reduction or a compound or a salt of a higher fatty acid can be employed, such as an alkali or alkaline earth metal salt as such or dissolved in solution in which it is soluble and which is added to the solution undergoing treatment. Preferably, the compound containing or the salt of the higher fatty acid should be sparingly soluble in the solution to be treated in order to concentrate as a film on the interface between the solution and the walls of the reaction vessel. Ammonium, sodium and potassium salts of the higher fatty acids are readily available and are relatively inexpensive and, therefore, can be employed with advantage in the method of the present invention.

The invention is, of course, based on results obtained in actual operation and is not dependent on hypothetical considerations. However, as a possible explanation of the improved results obtained, it may be that the addition agent forms a soapy or soap-like film or coating on the interior of the reaction vessel to which the metal powder does not adhere as reduction proceeds with the result that the metal powder precipitated from the solution remains dispersed as such in the solution rather than plating or depositing on the walls of the vessel.

The method of the present invention is independent of the source of the solution which contains dissolved salts of the metal or metals of interest. Usually, such solution will be prepared by a conventional or unconventional leaching method, such as by the use of an acid, basic or neutral lixiviant. Production of nickel and/or cobalt metal powder by gas reduction from solutions in which the metal is present as a dissolved salt appears to proceed most satisfactorily from a solution in which ammonia is present in the ratio of at least about two mols ammonia per mol of metal of interest. Thus, if the desired amount of ammonia is not present, as would be the case if the metals were extracted from the metal bearing material by and dissolved in an acid leach solution, ammonia can be added to the solution to provide the desired mol ratio of ammonia to metal. Alternatively, if an ammoniacal leach solution is employed in the leaching stage, it merely is necessary to adjust the ammonia content to the desired ratio, either by addition to or release of ammonia from the solution. Copper metal powder can be precipitated from either acid or ammoniacal solution by gas reduction and the pH value of the solution normally is adjusted to and maintained within that range from which most satisfactory reduction is obtained.

Reduction and precipitation of nickel and cobalt from solutions in which they are present, singly or together, as dissolved salts preferably is conducted in an ammoniated solution at elevated temperature, of the order of from about 200° F. to about 500° F., and preferably within the narrower range of from about 250° F. to about 400° F., and under a positive partial pressure of a reducing gas such as hydrogen within the range of from about 100 to about 600 pounds per square inch and preferably within the narrower range of from about 200 to about 500 pounds per square inch. The conditions of operation such as the mol ratio of ammonia to the metal of interest, hydrogen ion concentration, temperature, partial pressure of hydrogen and total pressure by which optimum reduction is obtained vary for each particular metal to be reduced and precipitated.

The following examples illustrate the operation of the method of the present invention.

Example I

A series of solutions of about 2300 cc. per charge and containing about 50 grams per liter nickel, 300 grams per liter ammonium sulphate, and a mol ratio of ammonia to nickel of about 2:1 were charged in consecutive charges into a pressure vessel and were treated with hydrogen at a temperature of about 350° F. and under a partial pressure of hydrogen of about 300 pounds per square inch. About 100 grams of finely divided nickel powder of the order of minus 200 mesh standard Tyler screen, was charged into the reaction vessel to aid in initiating the reduction. As the nickel content of each charge was reduced to about 1 gram per liter, the solution was discharged and a fresh charge of solution was added to the pressure vessel. Nickel metal powder precipitated readily with no apparent coating on the walls or agitator during the treatment of the first charge. Coating and deposition of metal on the walls were apparent at the end of the second charge and deposition increased during the treatment of the third charge to the extent that reduction was too slow to be commercially practical and substantially all nickel reduced during the fourth charge deposited or agglomerated on the walls of the reaction vessel. The operation had to be stopped at the end of the fourth charge to clean out the reaction vessel.

Example II

The treatment of a series of charges of solution having the same composition and conducted under the same conditions with the difference that about 0.05 gram of oleic acid per liter of solution were added in alcohol solution to each fresh charge of solution prior to reproduction. Coating of nickel on the walls of the reaction vessel was noted as the treatment of fresh charges was continued and although the number of charges which could be treated without stopping the process to clean out the reaction vessel was increased to five, the results were not altogether satisfactory although the deposited nickel had different physical characteristics than that produced in the first example and was easily removed from the reaction vessel.

Example III

The treatment of a series of charges of solution having the same composition and conducted under the same conditions with the difference that about 0.1 gram of oleic acid per liter of solution dissolved in alcohol were added to the first charge of solution charged into the reaction vessel and the oleic acid solution was thoroughly dispersed in the reaction vessel prior to the initiation of reduction. No oleic acid was added to subsequent solutions charged to the reaction vessel. There was no apparent deposition of nickel on the walls and parts of the reaction vessel and a series of nine consecutive charges of solution were treated. At the end of nine charges, it was necessary to discharge the contents of the reaction vessel due to the weight and volume of nickel powder which had accumulated during the treatment. Coating or plating of nickel on the walls and parts of the reaction vessel was of a very minor nature and did not interfere with the reduction or necessitate stopping operation of the method as in the previous examples.

Example IV

A solution containing about 25 grams of cobalt per litter, about 300 grams of ammonium sulphate per liter, and about 3 mols of ammonia per mol of cobalt was reacted with hydrogen at a temperature of about 250° F. and under a partial pressure of hydrogen of about 300 pounds per square inch. About 100 grams of cobalt powder finer than about 200 mesh standard Tyler screen was added to the reaction vessel as seed. It was found that all the cobalt metal reduced from the solution plated or deposited on the walls or the parts of the reaction vessel as a film or as agglomerates which necessitated stopping the operation to clean the vessel. The deposited cobalt was very difficult to remove.

Example V

The treatment of a series of charges of solution having the same composition and conducted under the same conditions with the difference that about 0.04 gram of oleic acid was added to the solution. The reduction of the cobalt bearing solution was completed without coating or agglomeration of cobalt on the walls of the reaction vessel, reduction proceeded rapidly, and the cobalt was recovered as a finely divided powder.

Example VI

The treatment of a series of charges of solution having the same composition and conducted under the same conditions with the difference that about 0.05 gram of stearic acid was added to the solution. The reduction of the cobalt bearing solution was completed without coating or agglomeration of cobalt on the walls of the reaction vessel, reduction proceeded rapidly, and the cobalt was recovered as a finely divided powder.

The amount of the higher fatty acid employed in the method of the present invention does not appear to be critical. It is found that as little as 0.01 gram per liter of solution substantially reduces the plating or agglomerating effect, although some plating or deposition of metal occurs on the walls of the reaction vessel. The most satisfactory results appear to be obtained in the use of from 0.01 to 0.1 gram per liter. Greater amounts can be employed, of course, but are not necessary.

Factors which affect the selection of a suitable addition agent for forming a soapy or soap-like film on the interior surfaces of the reaction vessel include the cost, availability and the tendency of the addition agent to contaminate undesirably the purity of the metal powder, and the decomposition temperature of the particular agent. For example, if the reduction is conducted at a temperature of the order of 350° F., an addition agent which decomposed above that temperature would be selected.

The present invention possesses a number of important advantages in that it provides a solution to difficulties encountered in the production of metal powders by gas reduction from solutions in which desired metal values are present as soluble salts. The use of higher fatty acids or their salts, or compounds containing such acids or salts eliminates altogether, or at least substantially reduces, the coating, deposition and/or agglomeration of metal on the walls and other parts of the reaction vessel during the course of the reducing reaction. The presence of the reagent facilitates the reducing reaction and increases the velocity of the reaction by preventing or at least substantially reducing the agglomeration of metal particles on the walls of the reaction vessel. Also, by eliminating or reducing the coating or agglomeration of metal on the walls or on parts, such as on the agitator, of the reaction vessel, difficulties in recovering the metal from the reaction vessel are largely overcome and the product metal is recovered from the reaction vessel without difficulty and as finely divided metal powder.

What I claim as new and desire to protect by Letters Patent of the United States is:

1. In precipitating powder of a metal of the group consisting of copper, nickel and cobalt by treatment of a solution in which the metal is present as a dissolved salt with a reducing gas at elevated temperature and pressure, the improvement which comprises providing in the solution a finite amount of a member of the group consisting of higher fatty acids and salts thereof and compounds containing higher fatty acids and salts thereof.

2. In precipitating powder of a metal of the group consisting of copper, nickel and cobalt by treatment of an ammoniated solution in which the metal is present as a dissolved salt with a reducing gas at elevated temperature and pressure, the improvement which comprises providing in the ammoniated solution a finite amount of a member of the group consisting of higher fatty acids and salts thereof and compounds containing higher fatty acids and salts thereof.

3. In precipitating powder of a metal of the group consisting of copper, nickel and cobalt by treatment of an ammoniated solution in which the metal is present as a dissolved salt with a reducing gas at elevated temperature and pressure, the improvement which comprises dispersing in the ammoniated solution prior to the initiation of reduction a finite amount of a member of the group consisting of higher fatty acids and salts thereof and compounds containing higher fatty acids and salts thereof.

4. In precipitating powder of a metal of the group consisting of copper, nickel and cobalt by treatment of an ammoniated solution in which the metal is present as a dissolved salt with a reducing gas at elevated temperature and pressure, the improvement which comprises providing in the ammoniated solution at least 0.01 gram per liter of a member of the group consisting of palmitic acid, oleic acid, stearic acid and salts thereof and compounds containing palmitic acid, oleic acid, stearic acid and salts thereof.

5. In precipitating powder of a metal of the group consisting of copper, nickel and cobalt by treatment in a reaction vessel of a solution in which metal is present as a dissolved salt with a reducing gas at elevated temperature and pressure, the improvement which comprises coating the interior walls of the reaction vessel with a soap-like film produced by dispersing in the solution prior to the initiation of reduction a finite amount of a member of the group consisting of higher fatty acids and salts thereof and compounds containing higher fatty acids and salts thereof.

6. In precipitating powder of a metal of the group consisting of copper, nickel and cobalt by treatment in a reaction vessel of a solution in which the metal is present as a dissolved salt with a reducing gas at elevated temperature and pressure, the improvement which comprises coating the interior walls of the reaction vessel with a soap-like film produced by dispersing in the solution prior to the initiation of reduction at least 0.01 gram per liter of a member of the group consisting of palmitic acid, oleic acid, stearic acid and salts thereof and compounds containing palmitic acid, oleic acid, stearic acid and salts thereof.

No references cited.